July 21, 1970 W. A. FARNBACH 3,521,088

OSCILLOSCOPE TRIGGER CIRCUIT

Filed June 29, 1967 2 Sheets-Sheet 1

INVENTOR
WILLIAM A. FARNBACH

BY A. C. Smith
ATTORNEY

July 21, 1970 W. A. FARNBACH 3,521,088

OSCILLOSCOPE TRIGGER CIRCUIT

Filed June 29, 1967 2 Sheets-Sheet 2

INVENTOR
WILLIAM A. FARNBACH

BY A. C. Smith

ATTORNEY

United States Patent Office 3,521,088

Patented July 21, 1970

3,521,088
OSCILLOSCOPE TRIGGER CIRCUIT

William A. Farnbach, Colorado Springs, Colo., assignor to Hewlett-Packard Company, Palo Alto, Calif., a corporation of California Filed June 29, 1967, Ser. No. 650,026
Int. Cl. H03k 3/315
U.S. Cl. 307—286 2 Claims

ABSTRACT OF THE DISCLOSURE

A pairs of tunnel diodes are connected to receive input and bias signals for operation in bistable, monostable or astable modes to produce trigger pulses at the repetition rate or at a submultiple of the repetition rate of the input signal.

BACKGROUND OF THE INVENTION

Certain known trigger circuits particularly useful for triggering oscilloscopes operate either in the bistable, monostable, or astable modes. Such trigger circuits have limited utility as each mode is useful in triggering only on certain classes of input signal and is not satisfactory for triggering on other classes of input signal.

SUMMARY OF THE INVENTION

In accordance with the illustrated embodiment of the present invention, a pair of tunnel diodes are biased to operate selectably in astable, monostable or bistable modes for reliability in triggering on input signals.

DESCRIPTION OF THE PREFERRED EMBODIMENT

Figure 1:
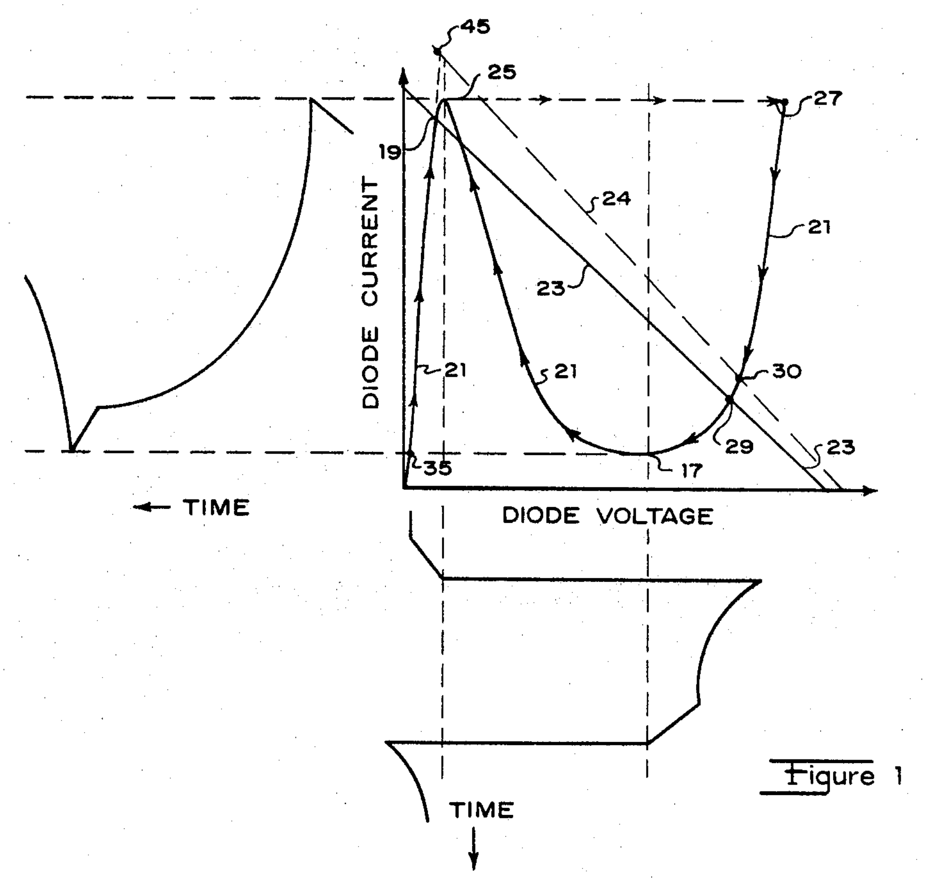
FIG. 1 is a graph showing the current and voltage relationships in the circuit of FIG. 2.
Figure 2:
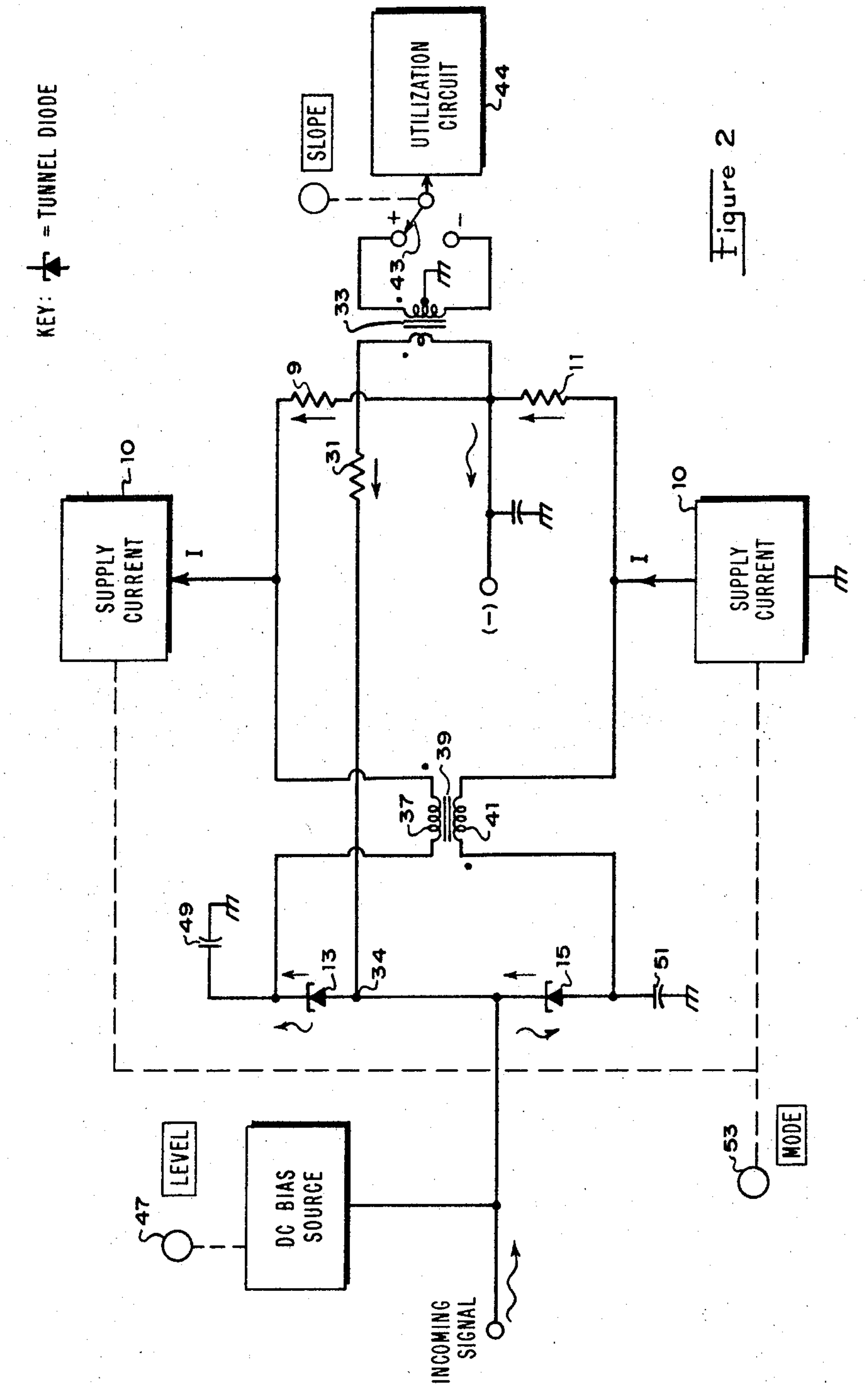
FIG. 2 is a schematic diagram of the trigger circuit of the present invention.

Referring now to FIG. 2, the resistors 9 and 11, and the supply current, I, are chosen so that one of the tunnel diodes 13 and 15 must be in its high-voltage state and the other in its low-voltage state at all times. If both diodes 13 and 15 attain their high-voltage states at once the voltage across resistors 9 and 11 becomes so large that all of the available supply current would have to flow through the resistors in order to maintain that voltage, typically about 750 millivolts. This causes the operating point of one of the tunnel diodes 13, 15 to fall to the valley point 17 in FIG. 1 and then return to the operating point 19 at the intersection of the characteristic curve 21 and load line 23. Likewise, if both diodes are in their low-voltage states simultaneously, virtually none of the supply current I from supply 10 would flow through the resistors 9 and 11. This would force the operating point of one or the other of the diodes 13 and 15 to shift to the peak point 25 and over to point 27 on the characteristic curve 21 from which the operating point would then shift to point 29 at the intersection of the load line 23 and the characteristic curve 21. The current supply network thus assures that one of the diodes must be at all times in its high-voltage state and the other in its low-voltage state.

The slope of the D.C. load line 21 in FIG. 1 is determined by resistor 31. Thus, the value of resistor 31 adjusts the current through the diodes 13 and 15 so that each diode operates at point 19 or 29 near its switching points 25 and 17, whether such diode is operating in the high-voltage or low-voltage state. The transformer 33 provides a convenient output port and functions primarily as an inductance in the circuit to prevent the currents in the two diodes from changing during the switching time between operating points 25 and 27 or between operating points 17 and 25.

The resultant signal of combined D.C. bias and incoming signal enters at node 34 and then splits through the diodes 13 and 15. One portion of the signal flows through diode 13, winding 37 of balun 39 and resistor 9 and the other portion flows through diode 15, winding 41 of balun 39 and resistor 11. A small portion of the signal flows through resistor 31 and transformer 33. The wavy arrows in FIG. 2 show the input signal current flow and the straight arrows show the direction of the supply-current flow if diode 13 is in its low-voltage state and diode 15 is in its high-voltage state.

Assume that diode 13 is in its low-voltage state, the input signal is zero, and the supply current is such that diode 13 is biased at operating point 19 near it peak point 25, as shown in FIG. 1. Diode 15 is then in its high voltage state at operating point 29. If the input signal is made more positive, the current through diode 13 moves the operating point 19 toward the peak points as the part of the input signal that flows through diode 13 adds to the total current through it. At the same time the current through diode 15 decreases and moves the operating point 29 toward the valley point 17. As soon as the current through diode 13 reaches the peak value 25, switching begins. The current through both diodes decreases as the voltage across diode 13 increases because more current begins to flow through resistors 31 and 9 to maintain the higher voltage across diode 13. The current through both diodes continues to decrease until the current flowing through diode 15 reaches the valley point 17. At this time, diode 15 switches to its low-voltage state. The current through both diodes remains roughly constant during the transition between points 17 and 35 and the voltage across diode 13 increases as the voltage across diode 15 decreases. The current through both diodes then changes relatively slowly between points 27 and 29 (for diode 13) and between point 35 and 19 (for diode 15). The RL time constant of resistor 31 and transformer 33 determines the rate at which the diode currents approach new steady-state values. The diodes 13 and 15 switch from the peak or valley points 25, 17 in about 1 nsec. and then reach their new steady-state currents at the operating points 19, 29 about 20 nsec. later. Since a positive-going input-signal caused diode 13 to switch to its higher voltage state and diode 15 to switch to its low voltage state, this state is the positive state of the present circuit.

The present circuit will switch from its positive state to its negative state if the input signal is made negative. When the input signal is negative the portion that flows through diode 15 and resistor 11 adds to the total current through diode 15 and the portion that flows through diode 13 and resistor 9 subtracts from the current flowing through diode 13. As soon as the input signal is made negative enough, diode 15 will initiate switching of both diodes just as diode 13 did in going from the negative state to the positive state.

When operated as described above, the circuit is a bistable threshold detector having a hysteresis band of input signal levels the width of which is determined by the supply current from supply 10. The less supply-current, the wider the hysteresis band. Transformer 33 differentiates the output and either the inverted or uninverted output may be selected by the setting of slope switch 43 which thus selects the slope of the input signal that will actuate the utilization circuit 44.

In order to make the circuit operate as an astable threshold detector, the supply current from supply 10 is increased until the new load line 24 shown in dotted lines in FIG. 1 is obtained. This load line 24 does not intersect the tunnel diode operating curve in the low-voltage region for either of the diodes 13, 15. This means that neither diode can remain in its low-voltage state. But the circuit also operates so that both diodes cannot be in their high-voltage states at once. These two conditions can be satisfied only if the circuit oscillates.

The mode of oscillation can best be explained by referring to FIG. 1. Assume that we start following the oscillations when diode 13 is operating at point 35 and diode 15 is operating at point 27, as shown in FIG. 1. Both diodes have just switched so the current in diode 13 is increasing toward point 45 on the load line 24 and the current in diode 15 is decreasing toward point 30 as the current through resistor 31 and transformer 33 approaches its new steady-state value. However, before the current in diode 13 reaches point 45, it reaches the peak point 25 and diode 13 begins to switch toward its high-voltage state. As the voltage across diode 13 increases, the current through both diodes decreases until diode 15 reaches the valley point 17 and begins to switch to its low-voltage state. Both diodes then switch to points 27 and 35 just as in the bistable case. This completes one half-cycle as diode 13 is now where diode 15 started, and vice versa. The current through diode 15 now increases toward 45 which causes diode 15 to start switching when the current attains the peak value at 25. Both diodes then switch to operation at points 27 and 35, which completes one cycle.

Figure 3:
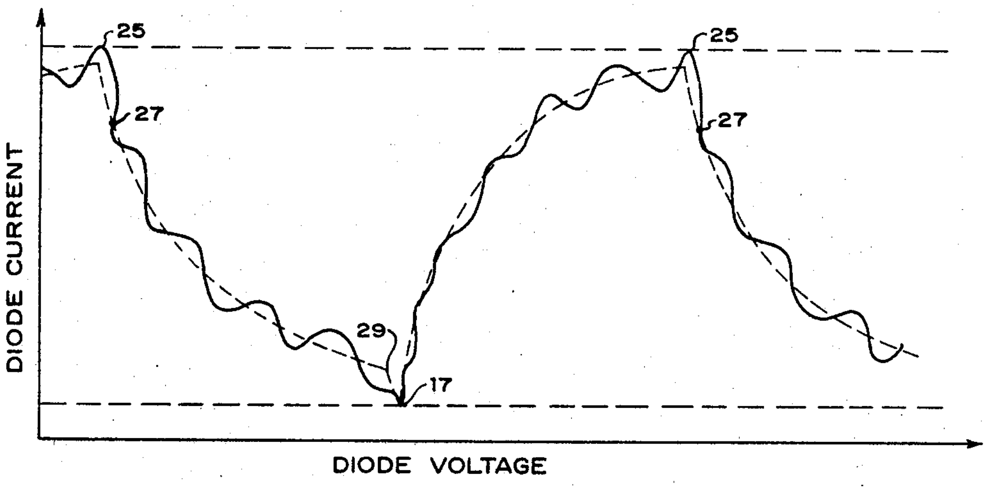
FIG. 3 is a graph showing the signal waveforms present in the circuit of FIG. 2 when operating as a countdown synchronizer.

FIG. 3 shows the currents through both diodes when the circuit is acting as a countdown synchronizer. The dashed lines represent the internally generated oscillation currents and the solid lines represent the sum of these currents and an input sinewave. It should be noted that switching is always initiated by the input sinewave. This means that the operating frequency of the detector is a subharmonic of the input signal. At one thousand mHz. this mode of operation provides about twenty times more sensitive triggering than either a bistable or a monostable threshold-detector.

The circuit may be made to operate monostably by using the level control 47 to adjust the load lines of the diodes 13 and 15 so that one is similar to load line 23 and the other is similar to load line 24 of FIG. 1. Since one load line intercepts its diode operating curve in the low-voltage region, one diode will be stable in the low state and the entire circuit will have one stable state. If the circuit is switched to its unstable state by an input signal, it will return to its stable state by following the same path as the astable circuit. However, when the current through one of the diodes reaches an intersection 19 with the load line 23 in the low-voltage region the circuit is stable and oscillation stops.

The balun 39 is polarized to present a high inductance to noise currents that are found to circulate around the circuit from node 34, through diode 13, the winding 37, resistors 9 and 11, winding 41 and diode 15. At the same time, the balun 39 presents a very low inductance to the split input-signal and internally-generated oscillating currents. Since the cancellation of the balun inductance seen by the input signal is not perfect, two small capacitors 49 and 51 are added to provide a low impedance path to ground for very high frequency input signals.

Therefore, the present circuit is capable of triggering on high-frequency sinewaves up to 5 gHz. and on pulses as narrow as 500 psec. or as small as 1 millivolt. It is also capable of triggering stability on either the leading or trailing edge of a pulse and on very long pulses. All of this may be controlled conveniently with only a front-panel control 53 for selecting the operating mode and a front panel control 47 for selecting the level of signal sensitivity.

I claim:

1. A trigger circuit comprising:

a pair of tunnel diodes serially connected in common current conduction direction between end terminals;

a pair of resistors serially connected between said end terminals;

first current supply means connected to said end terminals for supplying bias current through said tunnel diodes in the common current conduction direction;

second current supply means connected to the common connection of said tunnel diodes for altering the relative values of bias currents in said pair of tunnel diodes;

means connected to the common connection of said tunnel diodes for applying an input signal thereto; and means connected to the common connection of said tunnel diodes and to the common connection of said resistors for producing an output signal therefrom.

2. A trigger circuit as in claim 1 comprising: a transformer having one winding connecting one of said end terminals to one of resistors and tunnel diodes and having another winding connecting another of said end terminals to another of said resistors and diodes.

References Cited

UNITED STATES PATENTS 3,289,011 11/1966 May ---------------- 307—286

OTHER REFERENCES

I.B.M. Technical Disclosure Bulletin, E. Saki, Diode Trigger, Meyer, vol. 3, No. 9, February 1961, p. 32.

DONALD FORRER, Primary Examiner

B. P. DAVIS, Assistant Examiner

U.S. Cl. X.R.

307—322

UNITED STATES PATENT OFFICE

CERTIFICATE OF CORRECTION

Patent No. 3,521,088 Dated July 21, 1970

Inventor(s) William A. Farnbach

It is certified that error appears in the above-identified patent and that said Letters Patent are hereby corrected as shown below:

Column 2, line 4, "25" should read -- 35 --.

SIGNED AND SEALED NOV 17 1970

(SEAL)
Attest:

Edward M. Fletcher, Jr.
Attesting Officer

WILLIAM E. SCHUYLER, JR.
Commissioner of Patents

FORM PO-1050 (10-69) USCOMM-DC 60376-P69
0-160010 ☆ U.S. GOVERNMENT PRINTING OFFICE : 1969 O—366-334